July 23, 1968     L. J. SCHMERSAL     3,393,799
APPARATUS FOR MEASURING THE THICKNESS OF DIELECTRIC MEMBERS
Filed Dec. 21, 1966     2 Sheets-Sheet 1
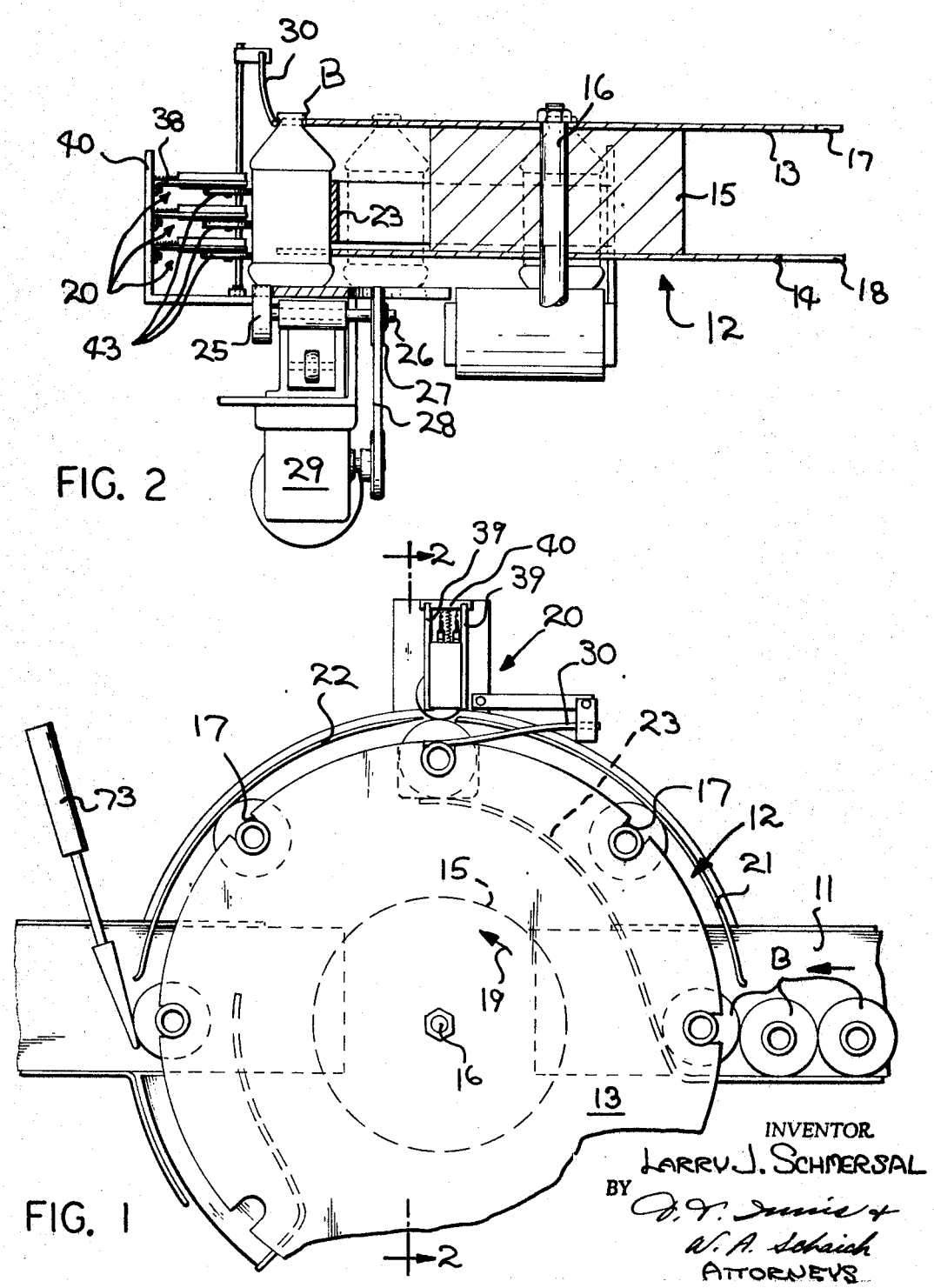

July 23, 1968     L. J. SCHMERSAL     3,393,799
APPARATUS FOR MEASURING THE THICKNESS OF DIELECTRIC MEMBERS
Filed Dec. 21, 1966     2 Sheets-Sheet 2

INVENTOR.
LARRY J. SCHMERSAL
BY
ATTORNEYS

United States Patent Office 3,393,799
Patented July 23, 1968

3,393,799
APPARATUS FOR MEASURING THE THICKNESS
OF DIELECTRIC MEMBERS
Larry J. Schmersal, Toledo, Ohio, assignor to Owens-Illinois, Inc., a corporation of Ohio
Filed Dec. 21, 1966, Ser. No. 603,628
9 Claims. (Cl. 209—73)

This invention relates to apparatus for measuring the thickness of glass members. More particularly, this invention relates to apparatus for inspecting glass containers for wall thickness at selected regions thereof.

The present invention is directed to the automatic inspecting apparatus capable of measuring the thickness of the wall portion of glass containers in which a radio frequency field is established in close proximity to a limited surface area of the container and the change in field strength due to the interposition of a dielectric material in the field is measured. This measurement is made by the positioning of a probe in the same plane as the field and centrally of the established field so that the field will pass into the wall of the container or dielectric member being gauged. The induced voltage at the probe will be an indication of the change in field strength due to the thickness of the dielectric. The voltage output from the probe has been found to be linear throughout a substantial portion of the measuring range and in particular for the range of glass containers whose thickness may vary between .010 inch and .070 inch.

It has been applicant's experience that it is desirable to segregate containers having wall thicknesses less than .040 inch, since experience shows that containers having thin areas in the wall portions thereof frequently become cracked or break during the handling of the containers through the filling and capping operations.

It has been the practice in the past to periodically sample glassware, formed on automatic forming machines, after the glassware has been annealed and cooled. These samples were then mechanically calipered to determine the wall thickness of the glass at various points in the wall of the article.

From experience, it has been determined that there are certain limits with respect to thickness of the glass forming the walls of the article, which are acceptable. In the case of blown glass containers, it has been found that when a container has a thick side wall there will usually be a correspondingly thin wall portion formed. If the deviation between the thickest and thinnest portion of the wall of the container is beyond tolerances, the container is not acceptable from the standpoint that it may not withstand pressures of the contents to be filled in the container or the container will not have sufficient strength to withstand the handling of the containers through the filling process.

Therefore, it is desirable that those containers which are not up to specification be segregated from the good bottles and discarded prior to shipping of the containers from the glass manufacturer to the bottler.

With the foregoing in view, it is an object of this invention to provide a fully automatic apparatus for positioning, inspecting and segregating bottles, jars and like articles according to their deviations of wall thickness from pre-set standards.

It is an additional object of this invention to provide apparatus which is compact in nature and may be capable of operating over extended periods of time without substantial maintenance problems.

It is a further object of this invention to provide a gauging system utilizing small radio frequency fields and high sensitivity probes such that changes in field strength may be detected with extreme accuracy and will provide signals indicative of the thickness of dielectric material positioned within the field.

It is a still further object of this invention to provide an electrically operated inspection system in which an R.F. antenna and sensitive probe are biased as a unit to track the walls of a container without appreciable vibration at high speeds.

Other and further objects will be apparent from the following description taken in conjunction with the annexed sheets of drawings, wherein:

FIG. 1 is a top plan view of the apparatus of the invention;

FIG. 2 is a cross-sectional view of the apparatus taken at line 2—2 of FIG. 1;

Figure 3:
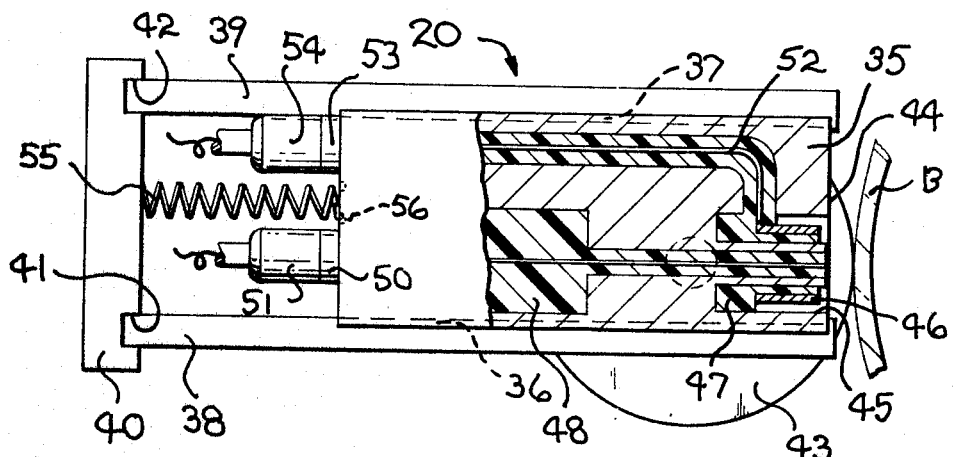
FIG. 3 is a top plan view with parts broken away of an individual measuring head.

As illustrated in FIGS. 1 and 2, the mechanism is for handling and feeding bottles individually from a succession of bottles positioned on a conveyor into a rotating carrier which carries the bottles to an inspection position where the bottles are rotated. The details of this mechanism are described in application Ser. No. 502,846 filed Oct. 23, 1965, of which applicant is a co-inventor.

The carrier will individually position a container in front of an inspection device and while the container is so positioned, it is rotated about its vertical axis and the inspection heads are held in precise, close proximity to the side wall of the bottle at selected vertical locations thereof. Since there are a plurality of inspection heads, and as would be readily appreciated, as many probe or inspection devices as desired may be mounted so as to gauge the thickness of a plurality of circumferential areas of the container wall.

Variations in the wall thickness of the container being inspected will result in an electrical output voltage which is transmitted by the electronic system to operate a mechanism to automatically reject any bottle which is found to be outside the dimension tolerances for acceptable containers.

With reference specifically to FIGS. 1 and 2, the apparatus of the invention is suitably supported in the position illustrated adjacent an incoming flight conveyor 11 which carries the bottles B to be inspected. In actual practice, the bottles are spaced along the length of the conveyor 11 so as to arrive in timed sequence with respect to the pockets formed in the carrier 12.

As best shown in FIGS. 1 and 2, the carrier 12 takes the form of a pair of parallel, spaced-apart "Micarta" discs 13 and 14. The "Micarta" discs 13 and 14 are connected together and spaced apart by block 15 with the unitary structure, generally designated 12, being driven by a shaft 16 fixed centrally thereof. The shaft 16 is driven by a mechanism (not shown) which provides an indexing motion, it being understood that for the particular mechanism shown in FIG. 1, the carrier 12 will be indexed 45° between each measuring interval.

The upper "Micarta" disc 13 is provided with slots 17 within which the neck of bottles B, which are to be inspected, will fit while the lower "Micarta" disc 14 is provided with slots 18 within which the lower side wall portion of the bottle will fit. Thus it can be seen that upon rotation or indexing movement of the carrier 12 in the direction of the arrow 19 shown thereon, the bottles B will be carried in succession from the incoming conveyor 11 into the inspection position opposite the inspection heads, generally designated 20.

The bottles are guided in their arcuate travel from the incoming conveyor 11 by a rail 21. A substantially identical rail 22 is provided on the exit side of the mechanism to effectively guide and hold the bottles within the pockets formed by the slots 17 and 18. It should be understood that these rails 21 and 22 are of sufficient width so as to engage the sides of the bottles in such a manner as to prevent them from tipping during their arcuate movement from the incoming conveyor 11 to and through the inspection position.

The incoming rail 21 is provided with a facing formed of a material which provides frictional contact with the bottles. As the bottles are moved from the incoming conveyor 11 into the inspection position, they will be rotated about their axis to an extent determined by their frictional engagement with the facing material on the rail 21. Thus it can be seen that the bottles, in effect, precess during their movement into the inspection position. This particular precession given to the bottles as they enter the inspection position has been found desirable when considering the later-to-be described method in which the bottles are driven while at the inspection position.

As the bottles are moving into the inspection position, they are forced outwardly of the slots 17 and 18 by engagement with a spring arm 23 which bears against the side wall of the bottle substantially midway of the height of the bottle. As the bottle comes into the position shown in full line in FIG. 2, the lower heel portion of the bottle will engage a driving roller 25. The roller 25 is carried by a shaft 26 which in turn carries a drive pulley 27. The pulley 27 is driven by a belt 28 from a motor 29. Thus it can be seen that the motor 29, which will be a constant speed motor, will drive the roller 25 continuously, and when the bottle arrives in engagement with the roller, the bottle will be rotated about its vertical axis. To prevent the bottle from bouncing on the roller 25 or becoming temporarily disengaged therefrom so as to provide uneven rotation of the bottle, the bottle is held down by a spring arm 30. If it is necessary to have additional hold-down means, a roller which engages the top of the bottle may be provided in the manner disclosed in the above-referred-to co-pending application Ser. No. 502,846.

In the foregoing manner the bottles are brought into the inspection position and rotated while retained with their axes substantially vertical during rotation by the driving roller 25.

As previously indicated, the rail 21 on the incoming side of the carrier 12, is provided with a frictional engaging surface so as to precess the bottles in a clockwise direction. In this manner the starting friction involved in rotating the bottles is overcome so that when the bottles arrive at the inspection station, the bottles will already be rotating clockwise and engagement with the roller 25 will impart additional clockwise rotation to the bottles at relatively high speed. In this manner smooth handling of the bottles is accomplished.

With the bottle to be inspected located in the inspecting position, a plurality of inspection heads 20 of substantially identical construction, but vertically spaced with respect to each other, will be held against the side wall of the bottle and effectively provide an arrangement for measuring the thickness of the bottle side wall throughout the circumference of the bottle at the vertically spaced intervals or regions opposite each inspection head.

It should be readily appreciated that the specific vertical spacing and location of the heads is a matter of design preference and experience when inspecting bottles. Each particular design of bottle usually has "problem areas." Due to the method of manufacturing the bottles, there is a tendency to form containers with thin wall sections at specific, known areas and in the setting up of the present inspection device, it is desirable that the heads be positioned opposite those portions of the walls of the containers which, through experience, have been found most likely to be areas where thin sections may appear.

As indicated, selection of the positioning of the heads with respect to the particular container being gauged, is a matter of experience gleaned after many years of operation of bottle forming machines and meticulous inspections of many formed bottles.

Figure 4:
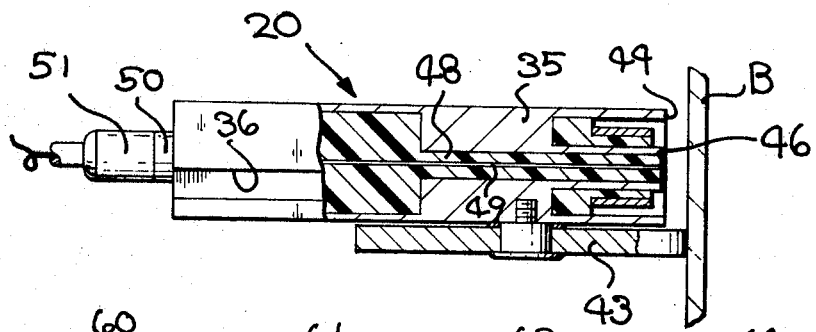
FIG. 4 is a side elevational view, partly in section, of the measuring head of FIG. 3.

The details of the inspection heads are shown specifically in FIGS. 3 and 4. Each head is formed of a block 35 of light-weight metal such as aluminum. The sides of the block 35 are provided with a pair of horizontal slots or grooves 36 and 37 extending along the length thereof which serve as mounting slideways in cooperation with a pair of horizontal rails 38 and 39. The rails are connected at their rearward ends to a mounting plate 40.

As shown in FIG. 2, the mounting plate 40 takes the form of a vertically positioned plate having two vertically extending, spaced-apart, slots 41 and 42. The rails 38 and 39 are bolted to the plate 40, it being understood that the rails 38 and 39 may be adjusted vertically to any desired point within the slots formed in the plate 40.

Each block 35 carries a stand-off wheel 43. As shown in detail in FIGS. 3 and 4, the axle for the wheel 43 is fixed to the lower surface of the block 35 with suitable bearings being provided between the wheel and its axle so that the wheel may freely rotate with respect to the block. The periphery of the wheel extends beyond the front face 44 of the block 35 and thus defines the stand-off distance of the inspection head with respect to a bottle B when the bottle is in gauging position.

The front face 44 of block 35 is drilled out to provide a shallow, annular cavity 45 within which a metal sleeve 46 is positioned. The sleeve 46 is supported within the cavity 45 by an annular plastic sleeve 47. The plastic sleeve 47 serves as a means for electrically insulating the metal sleeve 46 from the block 35. Block 35 is also provided with a horizontal opening coaxially located with respect to the cavity 45 and extending from the front face throughout the length thereof. An insulating sleeve 48 formed of a non-conductive plastic material is positioned within this opening. The sleeve 48 is provided with a bore extending throughout its length within which is positioned a small conductor 49 in the form of a copper wire with one end exposed at the front face of the inspecting head. This small conductor 49 serves as the measuring probe.

As indicated, the probe wire 49 extends through the insulating sleeve 48 and at the rearward face of the block 35 a quick-disconnect socket 50 is fixed with a cooperating plug-in element 51 providing the electrical connection to the probe wire 49.

The conductive sleeve 46, which forms a radio frequency antenna, is connected to a wire 52 which extends through a passage formed in the block 35. The wire 52 is insulated from the block and at the rearward face of the block there is provided a socket 53 to which the wire 52 is electrically connected. A complementary plug-in element 54 is connected to the socket 53.

The inspection head 20, as previously described, is formed of a light-weight material so as not to be subject to inertial effects when in contact with a rotating bottle and the block is biased forwardly by a spring 55 which extends between the mounting plate 40 and an annular seating groove 56 formed within the rear face of the block 35. In this manner the head 20 is biased in the direction of the article to be gauged, with the force of the spring 55 being less than the counter force exerted by the spring member 23. Thus it can be seen that during the inspection, as the bottle is rotated about its vertical axis, it is held out of the slots of the conveyor to a limited degree by the spring member 23 and the inspection heads 20 are biased so that their wheels 47 will be in engagement with the side surface of the bottle to be gauged.

The stand-off wheels 43, of which there is one associated with each inspecting head, will ride on the surface of the bottle or container and thus accurately position the probe of the inspection head at a fixed spacing from the bottle surface.

In operation, a high frequency signal in the order of 13,560,000 c.p.s. is connected to the antenna 46, thus establishing a radio frequency field which extends outwardly from the front face of the probe into the region of the side wall of the container to be gauged. This field will have a particular strength and shape, depending upon the dielectric of the material positioned in front thereof. When the inspection head is moved into engagement with a glass container, the field will be distorted to a certain extent and the field strength will be changed, depending upon the thickness of the dielectric material in front of the antenna. The strength of the field is measured by the amount of voltage induced in the probe wire 49. It has been found that when a glass dielectric material is placed at a stand-off distance of .125 inch from the front of the head 20, the voltage induced in the probe 49 varies linearly with variations in the thickness of the glass being gauged.

It should be understood that each of the plural inspection heads are identical to that described in detail and as shown in FIGS. 3 and 4. As many of these heads as are desirable may be provided to gauge the thickness characteristics of a test object. While the above disclosure has been directed principally to measuring the wall thickness of glass containers, it should be obvious that the present apparatus is capable of being utilized to gauge the thickness of other shapes of dielectric materials, such as sheet glass, tubing, etc.

As can readily be seen when using the device described above for gauging the thickness of sheet glass, it would only be necessary to bias the probe members against the surface of the sheet glass in much the same manner as they are biased against the side wall of the container. The voltage reading at the probe would be a clear indication of the thickness of the dielectric material.

Figure 5:
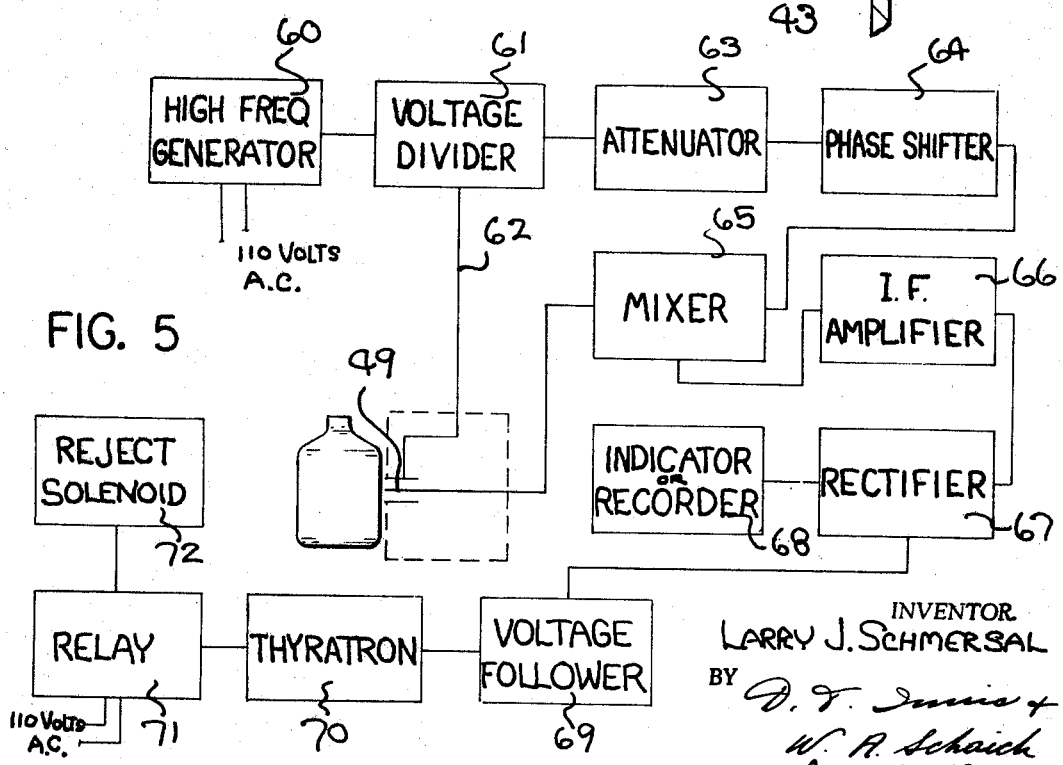
FIG. 5 is a schematic, electrical circuit diagram of the electronic system of the invention.

The electrical measuring system utilized in the present invention is illustrated in FIG. 5. A high frequency generator 60 has its output connected to a voltage divider 61. The voltage divider supplies the high frequency signal which is connected to the antenna 46 through the shielded conductor 62. The other output of the voltage divider is utilized as a reference signal and is fed to an attenuator 63, whose output is fed to a phase shifter 64. The voltage signal from the probe 49 is connected to a mixer 65 which also receives the reference signal from the phase shifter 64.

The mixer 65 is actually a mixing and coupling device of conventional construction. The output of the mixer is connected to an IF amplifier 66. It should be kept in mind that the reference voltage signal is "bucked" against the measuring signal so that any pre-selected portion of the measuring signal may be transmitted to the IF amplifier. The output of the IF amplifier 66 is connected to a rectifier 67 providing an output voltage which is a DC voltage. This DC voltage may be connected to an indicator or recording meter 68 or, as shown, is also connected to a voltage follower 69 which in turn is connected to a Thyratron 70. The Thyratron 70 is connected to a relay 71, with the operation of the relay controlling a reject solenoid 72 whose function or operation will control the reject motor 73 in the same manner as more fully described in the co-pending application Ser. No. 502,846 referred to above. The motor 73 is operated to move its plunger to the position shown in FIG. 1 to prevent a defective bottle from leaving the carrier 12 on the exit conveyor and upon index of the carrier the bottle will be removed at the next 45° displaced position of the carrier.

Other and further modifications may be resorted to without departing from the spirit and scope of the appended claims.

I claim:

1. Apparatus for measuring the thickness of an article formed of a dielectric material comprising, means for moving the article in a regular pattern, at least one inspection head, means connected to said head for maintaining said head at a fixed spacing from the moving article, said head comprising an annular antenna for establishing a radio frequency field in front of the head and extending outwardly therefrom in the direction of the article positioned adjacent thereto, a probe positioned coaxially of said annular antenna and electrically insulated therefrom, the outer end of said probe extending into the field adjacent the article, and voltage measuring means connected to said probe for measuring the voltage induced in the probe as an index of the thickness of that portion of the article immediately in front of the head.

2. The apparatus of claim 1, in which the means for maintaining the head at fixed distance from the article comprises a wheel rotatably connected to the head with a portion of its periphery extending beyond the front of the head.

3. An inspection head for measuring the thickness of a dielectric material wherein the head is adapted to be held in contact with the material, said head comprising, a light-weight body having a recessed front face, a cylindrical, conductive member positioned within the recess in said body with its axis normal to the front face of said body, means connected to said conductive member for electrically isolating said member from said body, a conductive probe mounted in said body and extending coaxially of said cylindrical member, means surrounding said probe for electrically isolating said probe from said body, and means mounted on said body and extending beyond the front face thereof adapted to contact the dielectric material being gauged to ensure accurate spacing of the front face of the body from the material being gauged.

4. The apparatus of claim 3, wherein said last mentioned means comprises, a wheel and means rotatably mounting said wheel on said body with a portion of the wheel periphery extending beyond the front face of the body.

5. Apparatus for measuring the thickness of glass containers comprising, in combination, means for moving a succession of containers into an inspection station, means at said station for rotating the containers about their vertical axes and a gauging head adapted to be held in contact with the container, said head comprising, a light-weight body having a recessed front face, a cylindrical, conductive member positioned within the recess in said body with its axis normal to the front face of said body, means connected to said conductive member for electrically isolating said member from said body, a conductive probe mounted in said body and extending coaxially of said cylindrical member, means surrounding said probe for electrically isolating said probe from said body, and means mounted on said body and extending beyond the front face thereof adapted to contact the container being gauged to ensure accurate spacing of the front face of the body from the container.

6. The apparatus of claim 5, wherein said last mentioned means comprises, a wheel, means rotatably mounting said wheel on said body with a portion of the wheel periphery extending beyond the front face of the body, and means connected to the body for holding the wheel against the container.

7. The apparatus of claim 5, further including a radio frequency source, means connecting said source to said cylindrical conductive member and voltage measuring means connected to said probe.

8. The apparatus of claim 7, wherein the means for moving the containers into an inspection station also move the containers away from the station, means adjacent said moving means for rejecting containers that are unacceptable and relay means connected to said voltage measuring means responsive to a preselected low voltage for actuating said reject means.

9. The apparatus of claim 7, further including additional gauging heads mounted in vertically spaced relationship to a container positioned at the inspection station, means connecting said source to the additional gauging heads and voltage measuring means connected to each probe.

References Cited

UNITED STATES PATENTS

| | | | |
|---|---|---|---|
| 3,117,276 | 1/1964 | Beyer et al. | 324—58.5 |
| 3,258,688 | 6/1966 | Augustine et al. | 324—58.5 |
| 3,271,668 | 9/1966 | Haake et al. | 324—58.5 |
| 3,307,446 | 3/1967 | Rottmann | 88—14 |
| 3,328,593 | 6/1967 | Johnson et al. | 88—14 |

ALLEN N. KNOWLES, *Primary Examiner.*